(12) United States Patent  
Liu

(10) Patent No.: US 10,587,544 B2  
(45) Date of Patent: Mar. 10, 2020

(54) MESSAGE PROCESSING METHOD, PROCESSING SERVER, TERMINAL, AND STORAGE MEDIUM

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 123 days.

(21) Appl. No.: 15/715,916

(22) Filed: Sep. 26, 2017

(65) Prior Publication Data

US 2018/0019961 A1 Jan. 18, 2018

Related U.S. Application Data

(63) Continuation of application No. PCT/CN2016/084521, filed on Jun. 2, 2016.

(30) Foreign Application Priority Data

Dec. 18, 2015 (CN) .......................... 2015 1 0956368

(51) Int. Cl.
*H04L 29/08* (2006.01)
*H04L 12/58* (2006.01)
(Continued)

(52) U.S. Cl.
CPC .......... *H04L 51/06* (2013.01); *H04L 12/1859* (2013.01); *H04L 51/18* (2013.01);
(Continued)

(58) Field of Classification Search
CPC ..... H04L 67/1097; G06F 16/182; G06F 3/067
See application file for complete search history.

(56) References Cited

U.S. PATENT DOCUMENTS 6,738,800 B1 * 5/2004 Aquilon ................ H04L 51/063  
709/203  
2006/0277257 A1 * 12/2006 Kromann ................ H04L 47/36  
709/206

(Continued)

FOREIGN PATENT DOCUMENTS

CN 102571872 7/2012  
CN 103634751 3/2014

(Continued)

OTHER PUBLICATIONS

International Search Report dated Sep. 30, 2016 in PCT/CN2016/084521 filed Jun. 2, 2016 (With English Translation).

*Primary Examiner* — Jeong S Park  
(74) *Attorney, Agent, or Firm* — Oblon, McClelland, Maier & Neustadt, L.L.P.

(57) ABSTRACT

A method includes receiving a message push request. The message push request includes message content to be sent to one or more users. The method further includes providing the message content to a cluster-based storage service system to store when a size of the message content is over a limit, receiving, from the cluster-based storage service system, an identifier for identifying the message content in the cluster-based storage service system, generating and sending a service message carrying the identifier of the message content to a terminal device associated with one of the one or more users, and sending a download address of the message content in the cluster-based storage service system to the terminal device in response to a download request.

20 Claims, 4 Drawing Sheets

(51) Int. Cl.
*H04L 29/06* (2006.01)
*H04L 12/18* (2006.01)

(52) U.S. Cl.
CPC ............ *H04L 51/24* (2013.01); *H04L 51/28* (2013.01); *H04L 67/1097* (2013.01); *H04L 67/26* (2013.01); *H04L 69/166* (2013.01); *H04L 51/32* (2013.01)

(56) References Cited

U.S. PATENT DOCUMENTS

| | | | | |
|---|---|---|---|---|
| 2008/0320003 | A1* | 12/2008 | Heinson | H04L 29/12066 |
| 2012/0265735 | A1* | 10/2012 | McMillan | H04N 21/8352 |
| | | | | 707/687 |
| 2012/0303517 | A1* | 11/2012 | Kang | G06Q 10/10 |
| | | | | 705/39 |
| 2014/0156687 | A1* | 6/2014 | Chen | G06F 16/1748 |
| | | | | 707/758 |
| 2015/0334182 | A1* | 11/2015 | Wu | H04L 67/1095 |
| | | | | 707/620 |
| 2015/0347404 | A1* | 12/2015 | Kim | G06F 16/93 |
| | | | | 707/827 |

FOREIGN PATENT DOCUMENTS

| | | |
|---|---|---|
| CN | 104253844 | 12/2014 |
| CN | 104601445 | 5/2015 |
| CN | 105577777 | 5/2016 |

\* cited by examiner

MESSAGE PROCESSING METHOD, PROCESSING SERVER, TERMINAL, AND STORAGE MEDIUM

RELATED APPLICATION

This application is a continuation of International Application No. PCT/CN2016/084521, filed on Jun. 2, 2016, which claims priority to Chinese Patent Application No. 201510956368.X, entitled "MESSAGE PROCESSING METHOD, APPARATUS, AND SYSTEM" filed on Dec. 18, 2015. The entire disclosures of the prior applications are hereby incorporated by reference herein in their entirety.

FIELD OF THE TECHNOLOGY

The present disclosure relates to the field of Internet technologies, specifically, to the field of Internet application technologies, and in particular, to a message processing method, a processing server, a terminal, and a storage medium.

BACKGROUND OF THE DISCLOSURE

The development of Internet technologies is accompanied with rapid development of Internet applications. A public service account is a service account that is registered by a developer or a service provider with an Internet application. The developer or the service provider may provide a service for one or more users in the Internet application by using the public service account. The Internet application may be a social application such as an instant messaging application or an SNS (Social Networking Service, social networking service) application, or may be a non-social application such as a game application or an e-commerce application. The public service account usually pushes a service message to a user in an Internet application. Currently, message content to be pushed by the public service account is directly packaged, according to the communication protocol, as a service message for transmission. However, with the need of service expanding, increasing developers or service providers request to push message content including rich materials such as images, audio, and videos. A current message processing manner causes a huge surge in a capacity of a service message, and even causes a capacity bottleneck. In addition, in a process of pushing the service message, problems such as congested transmission, a prolonged transmission delay, and affected push efficiency occur. Therefore, the current message processing process increasingly fails to adapt to a new message push service need.

SUMMARY

Embodiments of the present disclosure provide a message processing method, apparatus, and system, so as to not only present message content in a more flexible form to improve richness and an expressive force of a service message, but also improve message push efficiency.

Aspects of the disclosure provide a method for message processing. The method includes receiving, by circuitry of an information processing apparatus, a message push request from a public service account that provides a service to one or more accounts. The message push request includes message content to be sent to the one or more accounts. The method further includes determining whether a size characteristic of the message content meets a size requirement, when the size characteristic meets the size requirement, providing the message content to a cluster-based storage service system to store, receiving, from the cluster-based storage service system, an identifier for identifying the message content in the cluster-based storage service system, generating a service message. The service message carries the identifier of the message content. The method further includes sending the service message to a terminal device associated with an account registered for the service provided by the public service account, and sending a download address of the message content in the cluster-based storage service system to the terminal device when a download request sent by the terminal device according to the identifier of the message content is received. The download address is used by the terminal device to download the message content from the cluster-based storage service system.

In an embodiment, to determine whether the size characteristic of the message content meets the size requirement, the method includes obtaining a data volume of the message content, determining whether the data volume is greater than a threshold value of a maximum transmission unit (MTU); and when the data volume is greater than the threshold value of the MTU, determining that the size characteristic is a long message type; and when the data volume is less than the threshold value of the MTU, determining that the size characteristic is a short message type.

In an example, the cluster-based storage service system includes at least one storage server that each has a unique IP address. To provide the message content to the cluster-based storage service system to store, in an example, the method includes sending a storage instruction to the at least one storage server. The storage instruction includes the message content, and the storage instruction is used for controlling the at least one storage server to store the message content and generate a unique identifier of the message content stored in the at least one storage server.

In an embodiment, to send the download address of the message content in the cluster-based storage service system to the terminal device when the download request sent by the terminal device according to the identifier of the message content is received, the method includes when the download request that carries the identifier of the message content is received, sending one or more IP addresses of the at least one storage server to the terminal device. In another embodiment, the method includes when the download request that carries the identifier of the message content and a source IP address is received, selecting, from the one or more IP addresses of the at least one storage server, a target IP address based on the source IP address and sending the target IP address to the terminal device.

Aspects of the disclosure provide a method of message processing. The method includes receiving, by circuitry of a terminal device, a service message generated by an information processing apparatus in response to a message push request from a public service account that provides a service to one or more accounts, determining a message type that is indicated in the service message, extracting an identifier of message content from the service message when the message type satisfies a requirement, sending a download request to the information processing apparatus according to the identifier of the message content, receiving a download address for the message content from the information processing apparatus, and downloading the message content according to the download address.

In an example, the method further includes sending the download request carrying the identifier of the message content to the information processing apparatus, receiving one or more IP addresses for one or more storage servers from the information processing apparatus, selecting, from the one or more IP address corresponding to the one or more storage servers, an IP address based on a source IP address associated with the terminal device, and obtaining the message content from a storage server corresponding to the selected IP address.

Further in an example, the method includes sending the download request carrying the identifier of the message content and a source IP address associated with terminal device to the information processing apparatus, receiving an IP address that is determined by the information processing apparatus based on the source IP address, and obtaining the message content from a storage server corresponding to the IP address.

Aspects of the disclosure provide an information processing apparatus that includes interface circuitry and processing circuitry. The interface circuitry is configured to receive a message push request from a public service account that provides a service to one or more accounts, the message push request includes message content to be sent to the one or more accounts. The processing circuitry is configured to determine whether a size characteristic of the message content meets a size requirement, when the size characteristic meets the size requirement, provide, via the interface circuitry, the message content to a cluster-based storage service system to store, receive, from the cluster-based storage service system via the interface circuitry, an identifier for identifying the message content in the cluster-based storage service system, and generate a service message. The service message includes the identifier of the message content. The processing circuitry is further configured to send, via the interface circuitry, the service message to a terminal device associated with an account registered with the service provided by the public service account; and send a download address of the message content in the cluster-based storage service system to the terminal device when a download request sent by the terminal device according to the identifier of the message content is received. The download address is used by the terminal device to download the message content from the cluster-based storage service system.

Aspects of the disclosure provide a terminal device that includes interface circuitry and processing circuitry. The interface circuitry is configured to receive a service message generated by an information processing apparatus in response to a message push request from a public service account that provides a service to one or more accounts. The processing circuitry is configured to determine a message type that is indicated in the service message, extract an identifier of message content from the service message when the message type meets a requirement, send, via the interface circuitry, a download request to the information processing apparatus according to the identifier of the message content, receive, via the interface circuitry, a download address for the message content from the information processing apparatus; and download, via the interface circuitry, the message content according to the download address.

Aspects of the disclosure provide a non-transitory computer-readable medium storing instructions which when executed by a computer causes the computer to perform a method for message processing. The method includes receiving a message push request from a public service account that provides a service to one or more accounts. The message push request includes message content to be sent to the one or more accounts. The method further includes determining whether a size characteristic of the message content meets a size requirement, when the size characteristic meets the size requirement, providing the message content to a cluster-based storage service system to store, receiving, from the cluster-based storage service system, an identifier for identifying the message content in the cluster-based storage service system, generating a service message. The service message carries the identifier of the message content, sending the service message to a terminal device associated with an account registered for the service provided by the public service account. The method then includes sending a download address of the message content in the cluster-based storage service system to the terminal device when a download request sent by the terminal device according to the identifier of the message content is received. The download address is used by the terminal device to download the message content from the cluster-based storage service system.

Aspects of the disclosure provide a non-transitory computer-readable medium storing instructions which when executed by a computer causes the computer to perform a method for message processing. The method includes receiving a service message generated by an information processing apparatus in response to a message push request from a public service account that provides a service to one or more accounts, determining a message type that is indicated in the service message, extracting an identifier of message content from the service message when the message type satisfies a requirement, sending a download request to the information processing apparatus according to the identifier of the message content, receiving a download address for the message content from the information processing apparatus, and downloading the message content according to the download address.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. The accompanying drawings in the following description show some embodiments of the present disclosure, and a person of ordinary skill in the art may still derive other drawings from these accompanying drawings.

DESCRIPTION OF EMBODIMENTS

The following clearly and completely describes the technical solutions in the embodiments of the present disclosure with reference to the accompanying drawings in the embodiments of the present disclosure. The described embodiments are some of the embodiments of the present disclosure rather than all of the embodiments. All other embodiments obtained by a person of ordinary skill in the art based on the embodiments of the present disclosure shall fall within the protection scope of the present disclosure.

In the embodiments of the present disclosure, a service message of a long message type pushed by a public service account is transmitted in a push-pull combination manner. Specifically, the service message is separated from message content; a processing server pushes an identifier of the message content to a terminal by using an existing message transmission channel; and the terminal actively pulls the message content by using a dedicated download channel. According to the embodiments of the present disclosure, the message content can be not limited to a capacity of the service message and is presented in a more flexible form, thereby improving richness and an expressive force of the service message. In addition, a capacity bottleneck produced due to an increase in a data volume of the message content can be prevented for the service message, thereby avoiding transmission congestion caused due to the capacity of the service message, and improving message push efficiency.

Figure 1:
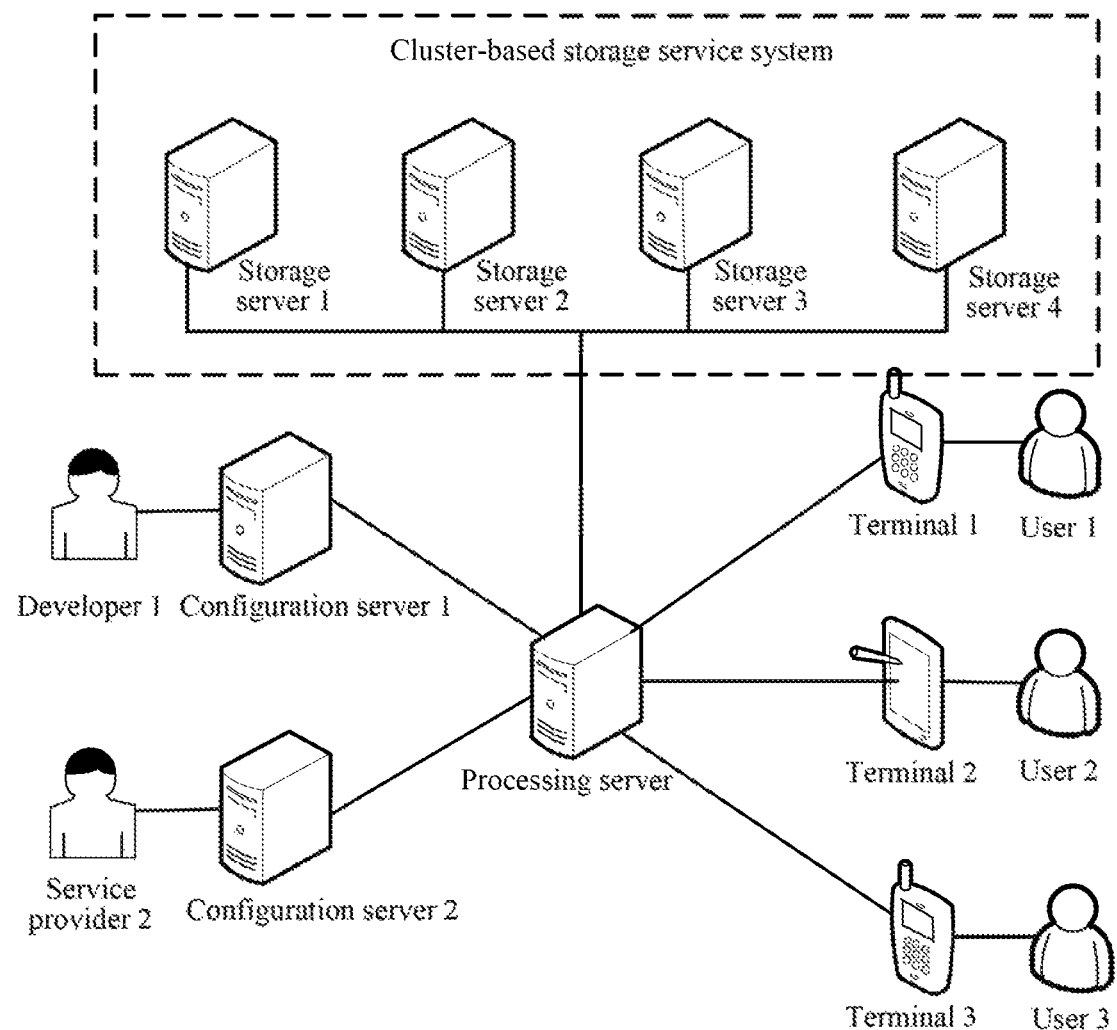
FIG. 1 is a schematic structural diagram of a message processing system according to an embodiment of the present disclosure.

Based on the foregoing principle, an embodiment of the present disclosure provides a message processing system. The system may be applied to a social application platform such as an instant messaging platform or an SNS platform, or may be applied to a non-social application platform such as an e-commerce platform. Referring to FIG. 1, the system may include a processing server, at least one configuration server connected to the processing server, and at least one terminal connected to the processing server.

The terminal may be a device such as a notebook computer, a mobile phone, a PAD (tablet computer), an in-vehicle terminal, or a smart wearable device. At least one type of Internet application may run in the terminal. The Internet application includes but is not limited to a social application, a game application, an e-commerce application, and the like. The social application refers to an application program that can implement a social function. The social application may include but is not limited to an instant messaging application, an SNS application, and the like. A user may use an Internet application on the terminal. For example, on a terminal A, a user A may register with and obtain an account identifier from an Internet application, and configure basic personal data such as an age and hobbies; or on a terminal A, a user A may manage private data such as a password of the user A in an Internet application; or on a terminal A, a user A may follow a public service account or add friends in an Internet application, to form a relationship chain of the user A.

The public service account is a service account that is allocated by a processing server to a developer or a service provider after the developer or the service provider registers with an Internet application platform. The Internet application with which the public service account registers may be referred to as an Internet application to which the public service account belongs. The developer or the service provider may provide a service such as message push for a user in the Internet application by using the public service account. One public service account corresponds to at least one configuration server. A configuration server of a public service account is a server that provides a service such as message push for a user in an Internet application by using the public service account. Specifically, the configuration server of the public service account may be an application server. For example, a developer of an e-commerce application registers, with a social application, a public service account having an identifier xx. A configuration server of the public service account xx may be an application server of the e-commerce application, and the configuration server of the public service account xx may provide an e-commerce related service for a user in the social application. Specifically, the configuration server of the public service account may also be a web server. For example, a service provider of a game site registers, with a social application, a public service account having an identifier yyy. A configuration server of the public service account yyy may be a web server of the game site, and the configuration server of the public service account yyy may provide a game related service for a user in the social application. The configuration server of the public service account may also be a third-party platform server. For example, a game developer registers, with a social application, a public service account having an identifier zz. However, the developer does not have a development capacity, and can authorize a third-party platform to develop a game. An authorized third-party platform server is a configuration server of the public service account zz. The developer provides a service for a user in the social application by using the configuration server of the public service account z.

The processing server may be a server that provides a service related to message processing for an Internet application platform. The processing server may be configured to process various requirements of the Internet application platform during implementation of a corresponding function, and may be configured to manage related data of a user in the Internet application, related data of a public service account, and an interactive message between the user and the public service account. The related data of the user may include but is not limited to an account identifier, a password, a relationship chain, and the like. The related data of the public service account may include but is not limited to an identifier, a relationship chain, and the like.

Still referring to FIG. 1, the message processing system in this embodiment of the present disclosure further includes a cluster-based storage service system. The cluster-based storage service system is configured to store message content that is separated from a service message of a long message type. The cluster-based storage service system includes at least one storage server, and each storage server has a unique IP address. A mechanism used by the cluster-based storage service system is as follows: Same message content is mirrored and stored in each storage server. That is, same message content may be stored in each storage server of the cluster-based storage service system. In addition, during storage, each storage server may generate a unique identifier of the message content. The message content may be read from each storage server according to the unique identifier of the message content. The cluster-based storage service system may provide a download service related to the message content, and a user may be connected to the cluster-based storage service system by using a terminal, to download required message content.

It can be understood that in an actual application, the message processing system shown in FIG. 1 may further include another structure, for example, may further include a database server configured to store the related data of the user and the public service account, or may further include a cache server configured to cache various interactive messages.

In this embodiment, the processing server may provide a message push management interface for a developer or a service provider. The developer or the service provider may access the message push management interface by using a configuration server of a public service account, to create and edit to-be-pushed message content. The message content herein may include but is not limited to text, an image, audio, a video, and the like. Further, the developer or the service provider may further edit a push object in the message push management interface. For example, the push object may be all or some users in an Internet application, or may be all users, a type of users, or a single user following the public service account. After the developer or the service provider completes the editing, the processing server may obtain the message content from the message push management interface, and determine a to-be-pushed message type according to the message content. If the to-be-pushed message type is a long message type, the processing server stores the message content in the cluster-based storage service system, and receives an identifier that is of the message content and that is returned by the cluster-based storage service system; encapsulates the identifier of the message content by using a communication protocol to form a target service message; and pushes, by using an existing message transmission channel, the service message to a terminal or terminals of one or more users in the Internet application to which the public service account belongs. The terminal may actively pull the message content by using a dedicated download channel according to the identifier of the message content that is carried in the target service message. Transmission of a service message of a long message type is implemented by means of push-pull exchanging between the processing server and the terminal. This can not only present message content in a more flexible form to improve richness and an expressive force of the service message, but also improve message push efficiency.

Figure 2:
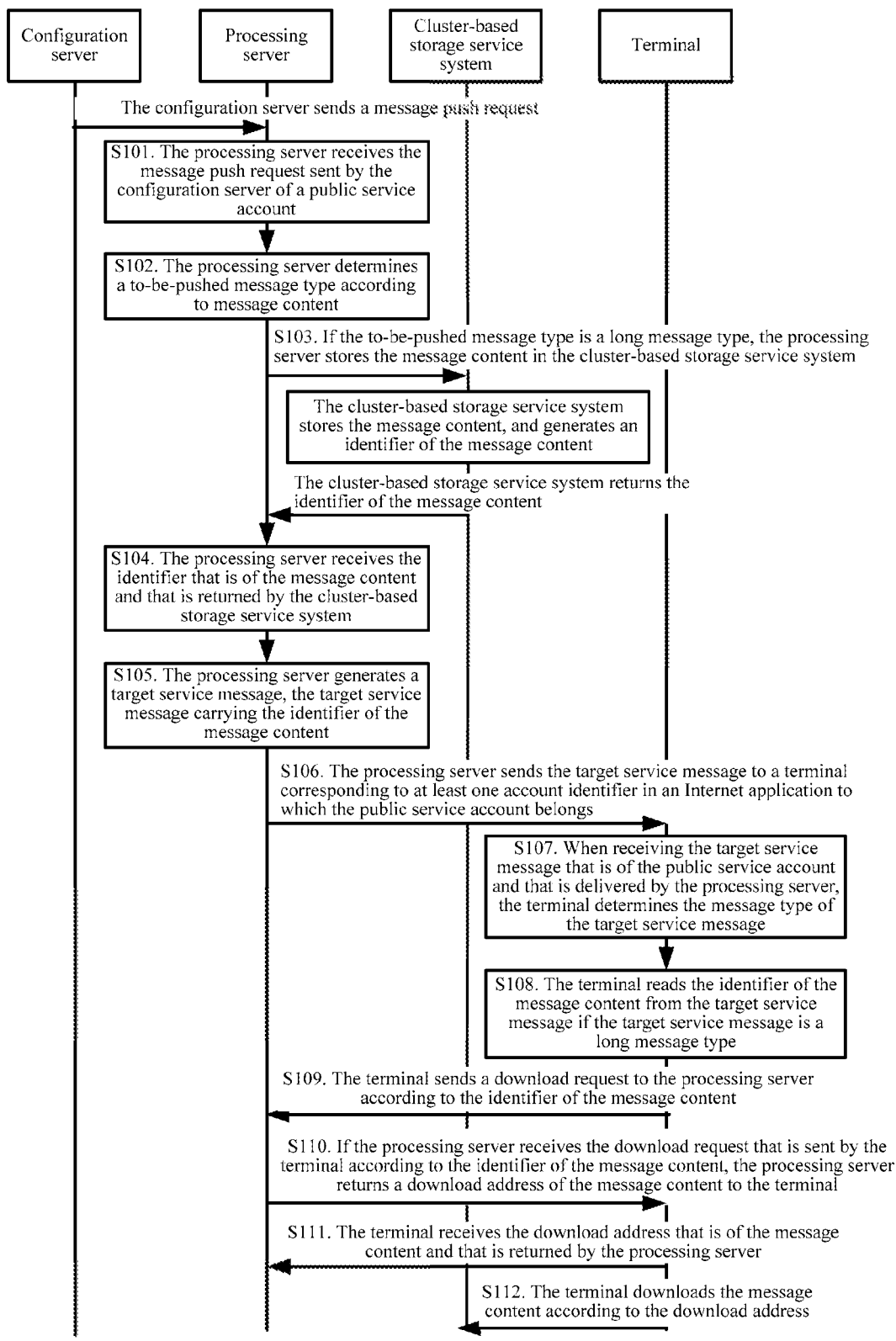
FIG. 2 is a flowchart of a message processing method according to an embodiment of the present disclosure.

Based on the foregoing descriptions, an embodiment of the present disclosure further provides a message processing method. The method may be applied to the system shown in FIG. 1. Referring to FIG. 2, the method may include the following step S101 to step S112. Step S101 to step S106 and step S110 may be specifically performed by the processing server shown in FIG. 1, and step S107 to step S109, step S111, and step S112 may be performed by any terminal shown in FIG. 1. During a process of performing the steps of the method, the processing server and the terminal interact with the configuration server and the cluster-based storage service system shown in FIG. 1. Specific descriptions are as follows:

S101: The processing server receives a message push request sent by a configuration server of a public service account, the message push request including to-be-pushed message content.

In this embodiment of the present disclosure, the processing server may provide a message system interface to the configuration server of the public service account and a terminal connected to an Internet application. The configuration server of the public service account may push a downlink message by using the message system interface, and the terminal may send an uplink message by using the message system interface. The configuration server of the public service account may create and edit the to-be-pushed message content in a message push management interface provided by the processing server. A message push request is generated after editing is completed and pushing of the message content is confirmed. The message push request is used for requesting to push a target service message to a user in the Internet application. In addition, the configuration server invokes the message system interface to transfer the message push request to the processing server. When listening to the message push request from the message system interface, the processing server may obtain the to-be-pushed message content from the message push management interface. The message content herein may include but is not limited to text, an image, audio, a video, and the like.

S102: The processing server determines a to-be-pushed message type according to the message content, the message type including a short message type or a long message type.

When performing step S102, the processing server specifically performs the following steps:

In a first step: Obtain a data volume of the message content. The data volume is used for describing a length or a size of data included in the message content. A measuring unit of the data volume includes bit (bit), byte (byte), KB (kilobyte), GB (gigabyte), and the like. After obtaining the message content, the processing server may calculate the data volume of the message content.

In a second step: Determine whether the data volume is greater than a value of an MTU.

The MTU is used for describing a size of a maximum data packet allowed in a communication protocol, and is usually measured in a unit of byte. Generally, the MTU is related to a communications interface (a network interface card, a serial port, or the like). A larger MTU indicates fewer data packets required for transmitting same data and higher communication efficiency. Generally, in a social application platform such as an instant messaging platform or an SNS platform, a value of an MTU is 1500 bytes.

In a third step: If the data volume is greater than the value of the MTU, determine that the to-be-pushed message type is a long message type; otherwise, determine that the to-be-pushed message type is a short message type.

In the process of the first step to the third step, after obtaining the message content from the message push management interface, the processing server calculates the data volume of the message content, and determines whether the data volume is greater than the value of the MTU. Using the value of the MTU being 1500 bytes as an example, if the data volume of the message content is greater than 1500 bytes, it indicates that a length of a to-be-pushed service message is greater than a length of one MTU, and the to-be-pushed message type is a long message type. Conversely, if the data volume of the message content is equal to or less than 1500 bytes, it indicates that a to-be-pushed service message may be carries in one MTU, and the to-be-pushed message type is a short message type.

It can be understood that the first step to the third step are an implementation in this embodiment of the present disclosure. In an actual application, another manner may be used. For example, a threshold may be set; and if the data volume of the message content is greater than the threshold, it is considered that the to-be-pushed message type is a long message type; otherwise, it is considered that the to-be-pushed message type is a short message type.

S103: If the to-be-pushed message type is a long message type, the processing server stores the message content in a cluster-based storage service system.

If the to-be-pushed message type is a short message type, the processing server may encapsulate the message content according to a communication protocol to form a service message, and push, by using an existing message transmission channel in an existing transmission manner, the service message to one or more users following the public service account. If the to-be-pushed message type is a long message type, the processing server may send a storage instruction to at least one storage server of the cluster-based storage service system, the storage instruction including the message content, and the storage instruction being used for controlling the at least one storage server to store the message content and generate a unique identifier of the message content. It is noted that the message content is stored in each storage server. Same message content may be stored in each storage server of the cluster-based storage service system, and the message content may be read from each storage server according to the unique identifier of the message content. Herein each storage server generates the unique identifier of the message content by using a same standard. Specifically, the unique identifier may be calculated based on a Hash (Hash) algorithm according to an attribute such as the data volume or a formation time stamp of the message content. Because attributes of the message content in all storage servers are consistent, the identifier of the message content calculated by each storage server is unique.

S104: The processing server receives an identifier that is of the message content and that is returned by the cluster-based storage service system. In this step, the identifier of the message content may be returned by any one or more storage servers of the cluster-based storage service system to the processing server. In subsequent steps of this embodiment of the present disclosure, Rkey may be used for representing the identifier of the message content.

S105: The processing server generates a target service message, the target service message carrying the identifier of the message content. The processing server encapsulates the identifier Rkey of the message content according to a communication protocol to form the target service message. The communication protocol herein may include but is not limited to the TCP (Transmission Control Protocol. Transmission Control Protocol) protocol, the UDP (User Datagram Protocol, User Datagram Protocol) protocol, and the like. In this step, it can be learned that the target service message carries the identifier of the message content rather than the message content, thereby separating the target service message from the message content.

S106: The processing server sends the target service message to a terminal corresponding to at least one account identifier in an Internet application to which the public service account belongs.

In a process of using the Internet application on a terminal, a user may register with and obtain an account identifier from the Internet application. Further, the user may follow at least one public service account to receive a service provided by the followed public service account. For example, a user A may follow a public service account zz corresponding to a video site in a social application. After the user A successfully follows the public service account z, an association relationship is established between an account identifier a corresponding to the user A and the public service account z, and the user A may receive a video download service or a video viewing service provided by the public service account zz. Generally, the processing server records a following relationship or an association relationship of the public service account by using a relationship chain, and maintains and manages the relationship chain of the public service account. For example, in the foregoing example, when the user A stops following the public service account zz, the association relationship between the account identifier a and the public service account zz is released. The processing server needs to update a relationship chain of the public service account zz. In a feasible implementation of this step, the processing server may send the target service message to terminals corresponding to account identifiers of all or some users in the Internet application. In another feasible implementation, the processing server may query the relationship chain of the public service account, obtain at least one account identifier having an association relationship with the public service account, and send the target service message to a terminal corresponding to the at least one account identifier. It can be understood that if the configuration server of the public service account specifies in the message push management interface that a push object is one or more users, in this step, the processing server selects an account identifier of the push object from the at least one account identifier, and pushes the target service message to a terminal corresponding to the account identifier of the push object.

S107: When receiving the target service message that is of the public service account and that is delivered by the processing server, the terminal determines the message type of the target service message, the message type including a short message type or a long message type.

The message type determining process in this step is performed on any terminal side on which the target service message is received. The terminal may parse the target service message according to a communication protocol, and determine whether the target service message includes specific message content or an identifier Rkey of message content. If the target service message includes the specific message content, it may be determined that the target service message is a short message type. If the target service message includes the identifier Rkey of the message content, it may be determined that the target service message is a long message type.

S108: The terminal reads the identifier of the message content from the target service message if the target service message is a long message type.

S109: The terminal sends a download request to the processing server according to the identifier of the message content.

S110: If the processing server receives the download request that is sent by the terminal according to the identifier of the message content, the processing server returns a download address of the message content to the terminal.

S111: The terminal receives the download address that is of the message content and that is returned by the processing server.

S112: The terminal downloads the message content according to the download address.

Step S109 to step S112 may include the following two feasible implementations. One of the feasible implementations is as follows:

The terminal may generate a download request carrying the identifier Rkey of the message content, and send the download request to the processing server. In this case, the processing server may return, according to the identifier Rkey of the message content, an IP address of at least one storage server storing the message content to the terminal. A download address received on a terminal side is the IP address of the at least one storage server. The terminal may select, based on a principle of proximity and from the IP address of the at least one storage server, a target IP address closest to a local source IP address of the terminal, and obtain the message content from a target storage server corresponding to the target IP address.

The other feasible implementation is as follows:

The terminal may generate a download request carrying both the identifier Rkey of the message content and a local source IP address of the terminal, and send the download request to the processing server. In this case, the processing server may select, based on a principle of proximity and from an IP address of at least one storage server storing the message content, a target IP address closest to the local source IP address of the terminal, and return the target IP address to the terminal. A download address received on a terminal side is the target IP address. Then the terminal obtains the message content from a target storage server corresponding to the target IP address.

It is noted that a difference between the two feasible implementations is: whether the terminal selects a nearby target IP address or the processing server selects a nearby target IP address. Selecting the target IP address based on the principle of proximity may enable the message content to be transmitted on a shortest transmission path, reducing a transmission delay and improving download efficiency. The target IP address can be redirected to a position of the target storage server, and the identifier Rkey of the message content can be redirected to a position of the message content in the target storage server. Therefore, the terminal can obtain, by using the obtained target IP address and identifier Rkey of the message content, a unique URL (Uniform Resource Locator, uniform resource locator) for obtaining the message content, and download the message content based on the URL. In addition, after obtaining the message content, the terminal may output the target service message and the message content. A terminal-side user may view the output target service message and message content on the terminal.

According to the message processing method in this embodiment of the present disclosure, when a message push request of a public service account is received, a to-be-pushed message type is determined according to to-be-pushed message content. For a to-be-pushed service message of a long message type, the service message and message content are separated, and an identifier of the message content is pushed to a terminal by using an existing message transmission channel. The terminal actively pulls the message content by using a dedicated download channel. In this way, the message content can be not limited to a capacity of the service message and is presented in a more flexible form, thereby improving richness and an expressive force of the service message. In addition, a capacity bottleneck produced due to an increase in a data volume of the message content can be prevented for the service message, thereby avoiding transmission congestion caused due to the capacity of the service message, and improving message push efficiency.

Figure 3:
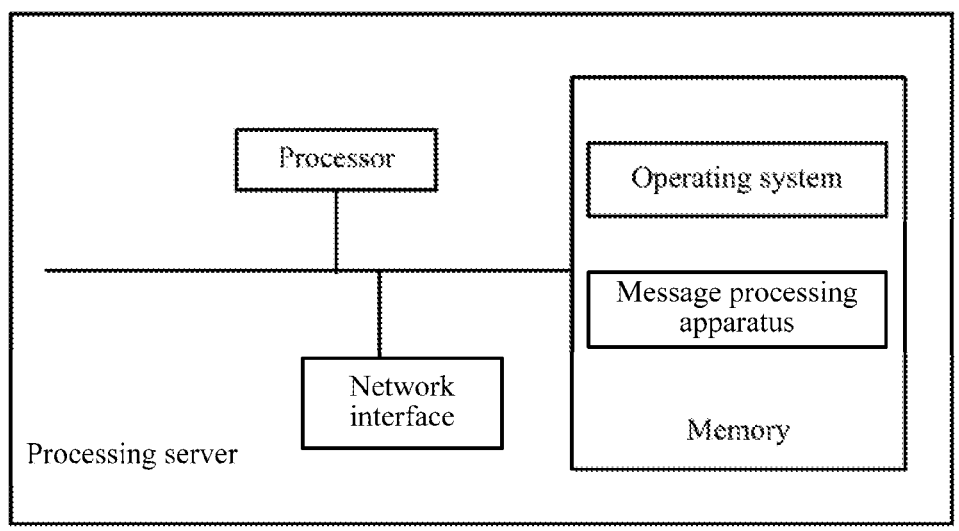
FIG. 3 is a schematic structural diagram of a processing server according to an embodiment of the present disclosure.

Based on the message processing system and the message processing method in the embodiments, an embodiment of the present disclosure further provides a processing server. The processing server may be the processing server shown in FIG. 1, and may be configured to perform the corresponding steps in the method process shown in FIG. 2. Referring to FIG. 3, an internal structure of the processing server may include but is not limited to a processor, a network interface, and a memory. The processor, the user interface, the network interface, and the memory of the processing server may be connected by using a bus or in another manner. In FIG. 3, a bus connection is used as an example in this embodiment of the present disclosure.

A processor (or referred to as a CPU (Central Processing Unit, central processing unit)) is a computing core and a control core of the processing server. The network interface may optionally include a standard wired interface or a wireless interface (such as WiFi or a mobile communications interface). The memory (Memory) is a storage device of the processing server and is configured to store a program and data. It can be understood that the memory herein may be a high-speed RAM memory, a non-volatile memory (non-volatile memory), for example, at least one magnetic disk memory, or at least one storage apparatus far from the processor. The memory provides storage space. The storage space stores an operating system of the server, including but not limited to a Windows system (an operating system), a Linux system (an operating system), and the like. This is not limited in the present disclosure. The storage space of the memory further stores a message processing apparatus. By running the message processing apparatus stored in the memory, when a message push request of a public service account is received, the processing server can determine a to-be-pushed message type according to to-be-pushed message content; for a to-be-pushed service message of a long message type, separate the service message and message content; and push an identifier of the message content to a terminal by using an existing message transmission channel. The terminal actively pulls the message content by using a dedicated download channel. In this way, the message content can be not limited to a capacity of the service message and is presented in a more flexible form, thereby improving richness and an expressive force of the service message. In addition, a capacity bottleneck produced due to an increase in a data volume of the message content can be prevented for the service message, thereby avoiding transmission congestion caused due to the capacity of the service message, and improving message push efficiency.

Figure 4:
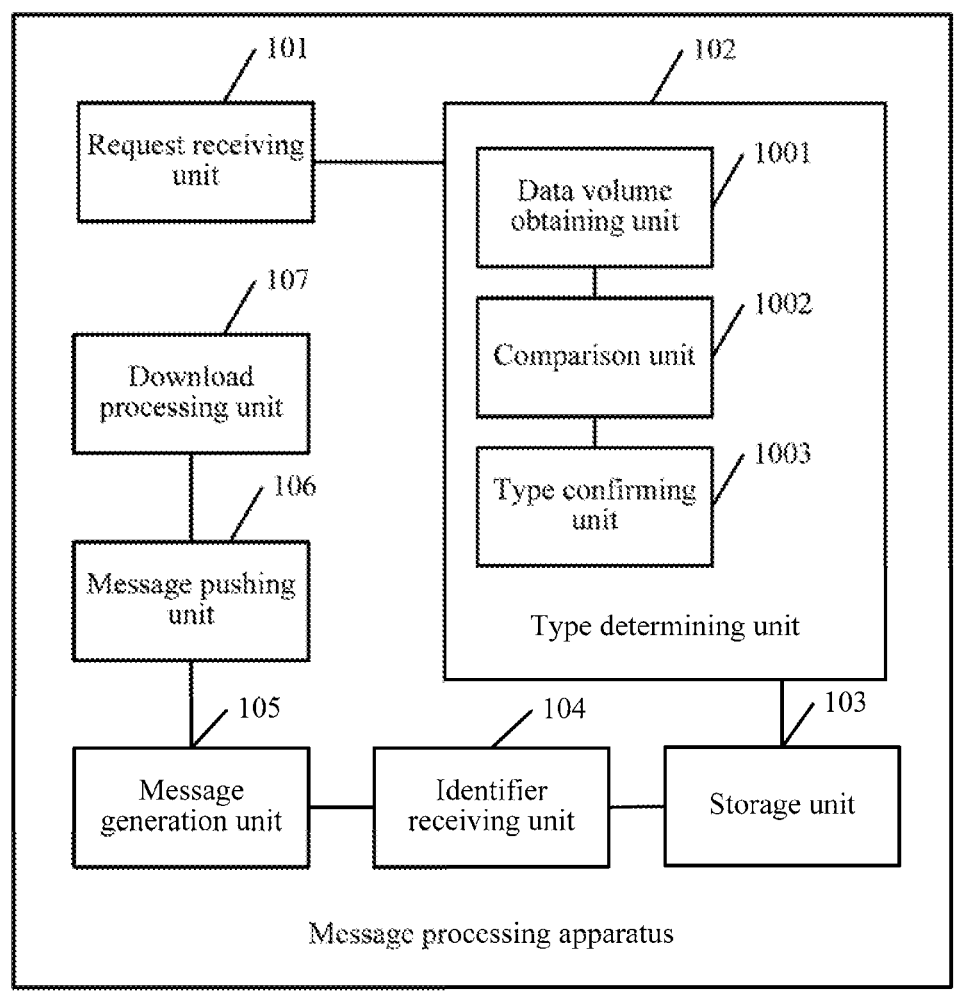
FIG. 4 is a schematic structural diagram of a message processing apparatus according to an embodiment of the present disclosure.

In this embodiment of the present disclosure, the processing server performs the corresponding steps in the method process shown in FIG. 2 by running the message processing apparatus in the memory. Further referring to FIG. 4, during message processing, the apparatus runs the following units:

a request receiving unit 101, configured to receive a message push request sent by a configuration server of a public service account, the message push request including to-be-pushed message content;

a type determining unit 102, configured to determine a to-be-pushed message type according to the message content, the message type including a short message type or a long message type;

a storage unit 103, configured to: if the to-be-pushed message type is a long message type, store the message content in a cluster-based storage service system;

an identifier receiving unit 104, configured to receive an identifier that is of the message content and that is returned by the cluster-based storage service system;

a message generation unit 105, configured to generate a target service message, the target service message carrying the identifier of the message content;

a message pushing unit 106, configured to send the target service message to a terminal corresponding to at least one account identifier in an Internet application to which the public service account belongs; and a download processing unit 107, configured to: if the download request that is sent by the terminal according to the identifier of the message content is received, return a download address of the message content to the terminal.

During a specific implementation, in a process of running the type determining unit 102 by the apparatus, the apparatus specifically runs the following units:

a data volume obtaining unit 1001, configured to obtain a data volume of the message content;

a comparison unit 1002, configured to determine whether the data volume is greater than a value of an MTU; and a type confirming unit 1003, configured to: if the data volume is greater than the value of the MTU, determine that the to-be-pushed message type is a long message type; otherwise, determine that the to-be-pushed message type is a short message type.

During a specific implementation, the cluster-based storage service includes at least one storage server, and each storage server has a unique IP address. Based on this, a process of running the storage unit 103 by the apparatus is specifically: sending a storage instruction to the at least one storage server, the storage instruction including the message content, and the storage instruction being used for controlling the at least one storage server to store the message content and generate a unique identifier of the message content.

During a specific implementation, a process of running the download processing unit 107 by the apparatus is specifically: if a download request that carries the identifier of the message content and that is sent by the terminal is received, returning the IP address of the at least one storage server to the terminal; or if a download request that carries the identifier of the message content and a source IP address and that is sent by the terminal is received, selecting, from the IP address of the at least one storage server, a target IP address that is closest to the source IP address and returning the target IP address to the terminal.

The message processing apparatus stored in the storage space of the memory may also be an application program (a computer readable program code) in the processing server. In this case, the processor executes the application program to perform the following operations:

receiving a message push request sent by a configuration server of a public service account, the message push request including to-be-pushed message content;

determining a to-be-pushed message type according to the message content, the message type including a short message type or a long message type;

if the to-be-pushed message type is a long message type, storing the message content in a cluster-based storage service system, and receiving an identifier that is of the message content and that is returned by the cluster-based storage service system;

generating a target service message, the target service message carrying the identifier of the message content;

sending the target service message to a terminal corresponding to at least one account identifier in an Internet application to which the public service account belongs; and returning a download address of the message content to the terminal if a download request sent by the terminal according to the identifier of the message content is received, so that the terminal downloads the message content according to the download address.

Further, the determining a to-be-pushed message type according to the message content includes: obtaining a data volume of the message content; determining whether the data volume is greater than a value of an MTU; and if the data volume is greater than the value of the MTU, determining that the to-be-pushed message type is a long message type; otherwise, determining that the to-be-pushed message type is a short message type.

Further, the cluster-based storage service system includes at least one storage server, and each storage server has a unique IP address. The storing the message content in a cluster-based storage service system is specifically: sending a storage instruction to the at least one storage server, the storage instruction including the message content, and the storage instruction being used for controlling the at least one storage server to store the message content and generate a unique identifier of the message content.

Further, the returning a download address of the message content to the terminal if a download request sent by the terminal according to the identifier of the message content is received is specifically: if a download request that carries the identifier of the message content and that is sent by the terminal is received, returning the IP address of the at least one storage server to the terminal; or if a download request that carries the identifier of the message content and a source IP address and that is sent by the terminal is received, selecting, from the IP address of the at least one storage server, a target IP address that is closest to the source IP address and returning the target IP address to the terminal.

Similar to the method shown in FIG. 2, by running the message processing apparatus in this embodiment, when a message push request of a public service account is received, the processing server can determine a to-be-pushed message type according to to-be-pushed message content; for a to-be-pushed service message of a long message type, separate the service message and message content; and push an identifier of the message content to a terminal by using an existing message transmission channel. The terminal actively pulls the message content by using a dedicated download channel. In this way, the message content can be not limited to a capacity of the service message and is presented in a more flexible form, thereby improving richness and an expressive force of the service message. In addition, a capacity bottleneck produced due to an increase in a data volume of the message content can be prevented for the service message, thereby avoiding transmission congestion caused due to the capacity of the service message, and improving message push efficiency.

Figure 5:
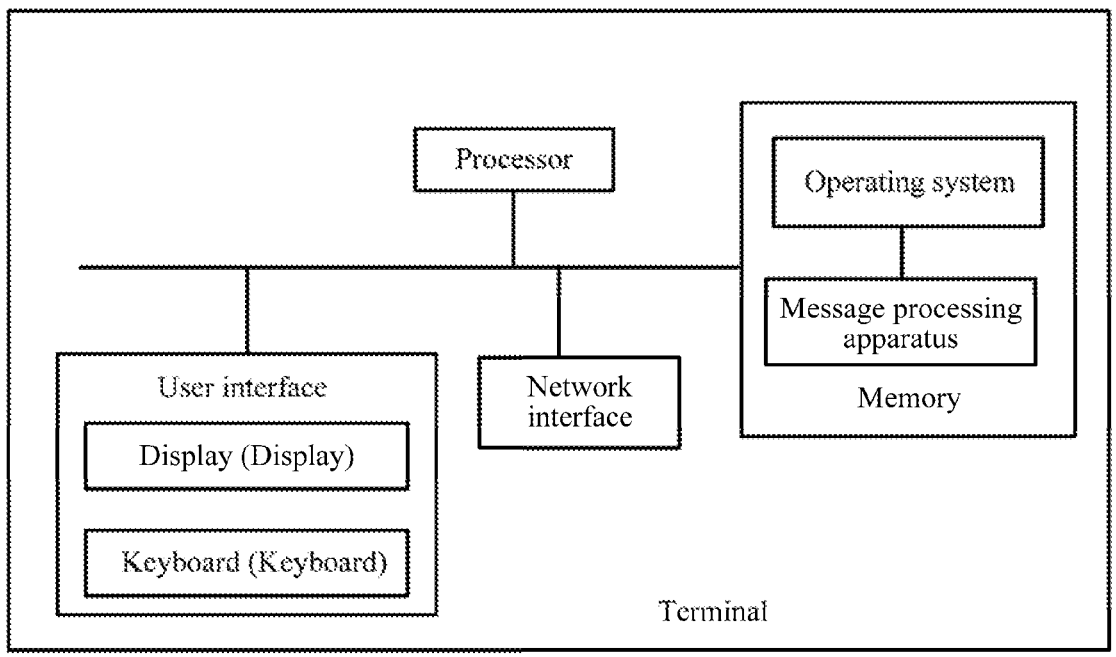
FIG. 5 is a schematic structural diagram of a terminal according to an embodiment of the present disclosure.

Based on the message processing system and the message processing method in the embodiments, an embodiment of the present disclosure further provides a terminal. The terminal may be any terminal shown in FIG. 1, and may be configured to perform the corresponding steps in the method process shown in FIG. 2. Referring to FIG. 5, an internal structure of the terminal may include but is not limited to a processor, a user interface, a network interface, and a memory. The processor, the user interface, the network interface, and the memory in the terminal may be connected by using a bus or in another manner. In FIG. 5, a bus connection is used as an example in this embodiment of the present disclosure.

The user interface is a medium for implementing interaction and information exchange between a user and the terminal. A specific implementation of the terminal may include a display (Display) for output, a keyboard (Keyboard) for input, and the like. It is noted that the keyboard herein may be a physical keyboard, a virtual touchscreen keyboard, or a combination of a physical keyboard and a virtual touchscreen keyboard. A processor (or referred to as a CPU (Central Processing Unit, central processing unit)) is a computing core and a control core of the terminal, and can parse various instructions in the terminal and process various data in the terminal. For example, the CPU can be configured to parse an on-off instruction sent by a user to the terminal, and control the terminal to perform an on-off operation. For another example, the CPU can transmit various interactive data between the internal structures of the terminal. The memory (Memory) is a storage device of the terminal and is configured to store a program and data. It can be understood that the memory herein may include an internal memory of the terminal, and may certainly include an extended memory supported by the terminal. The memory provides storage space. The storage space stores an operating system of the terminal, including but not limited to a Windows system (an operating system), an Android system (Android, a mobile operating system), an IOS system (a mobile operating system), and the like. This is not limited in the present disclosure. The storage space of the memory stores a message processing apparatus.

Figure 6:
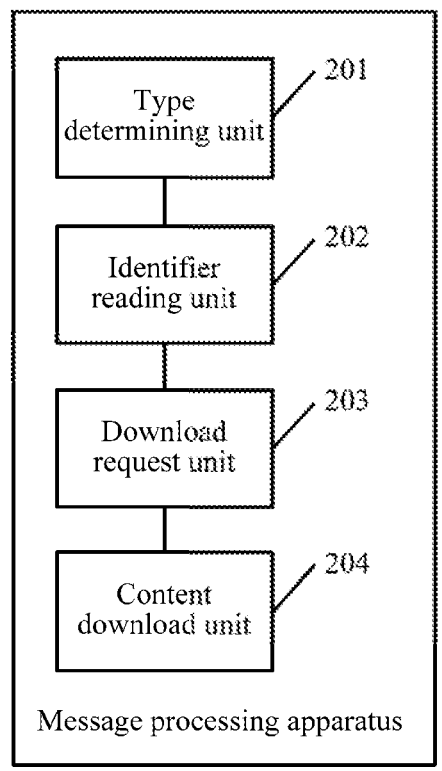
FIG. 6 is a schematic structural diagram of another message processing apparatus according to an embodiment of the present disclosure.

In this embodiment of the present disclosure, the terminal performs the corresponding steps in the method process shown in FIG. 2 by running the message processing apparatus in the memory. Further referring to FIG. 6, during message processing, the apparatus runs the following units:

a type determining unit 201, configured to: when a target service message that is of a public service account and that is delivered by a processing server is received, determine a message type of the target service message, the message type including a short message type or a long message type;

an identifier reading unit 202, configured to read an identifier of message content from the target service message if the target service message is a long message type;

a download request unit 203, configured to: send a download request to the processing server according to the identifier of the message content, and receive a download address that is of the message content and that is returned by the processing server; and a content download unit 204, configured to download the message content according to the download address.

In a feasible implementation of this embodiment, a process of running the download request unit 203 by the apparatus is specifically: sending a download request carrying the identifier of the message content to the processing server, and receiving an IP address that is of at least one storage server and that is returned by the processing server.

A process of running the content download unit 204 by the apparatus is specifically: selecting, from the IP address of the at least one storage server, a target IP address closest to a local source IP address; and obtaining the message content from a target storage server corresponding to the target IP address.

In another feasible implementation of this embodiment, a process of running the download request unit 203 by the apparatus is specifically: sending a download request carrying the identifier of the message content and a source IP address to the processing server, and receiving a target IP address returned by the processing server.

A process of running the content download unit 204 by the apparatus is specifically: obtaining the message content from a target storage server corresponding to the target IP address.

The message processing apparatus stored in the storage space of the memory may also be an application program (a computer readable program code) in the terminal. For example, the apparatus may be an instant messaging application in the terminal. In this case, the processor executes the application program to perform the following operations:

when a target service message that is of a public service account and that is delivered by a processing server is received, determining a message type of the target service message, the message type including a short message type or a long message type;

reading an identifier of message content from the target service message if the target service message is a long message type;

sending a download request to the processing server according to the identifier of the message content, and receiving a download address that is of the message content and that is returned by the processing server; and downloading the message content according to the download address.

Further, the sending a download request to the processing server according to the identifier of the message content, and receiving a download address that is of the message content and that is returned by the processing server is specifically: sending a download request carrying the identifier of the message content to the processing server, and receiving an IP address that is of at least one storage server and that is returned by the processing server. The downloading the message content according to the download address is specifically: selecting, from the IP address of the at least one storage server, a target IP address closest to a local source IP address; and obtaining the message content from a target storage server corresponding to the target IP address.

Further, the sending a download request to the processing server according to the identifier of the message content, and receiving a download address that is of the message content and that is returned by the processing server is specifically: sending a download request carrying the identifier of the message content and a source IP address to the processing server, and receiving a target IP address returned by the processing server. The downloading the message content according to the download address is specifically: obtaining the message content from a target storage server corresponding to the target IP address.

Similar to the method shown in FIG. 2, by running the message processing apparatus in this embodiment, when the terminal determines that a target service message that is of a public service account and that is delivered by a processing server is a long message type, the terminal can read an identifier of message content from the target service message, receive a download address of the message content from the processing server according to the identifier of the message content, and actively pull the message content according to the download address. Because the target service message is separated from the message content, the processing server pushes the identifier of the message content to the terminal by using an existing message transmission channel. The terminal actively pulls the message content by using a dedicated download channel. In this way, the message content can be not limited to a capacity of the service message and is presented in a more flexible form, thereby improving richness and an expressive force of the service message. In addition, a capacity bottleneck produced due to an increase in a data volume of the message content can be prevented for the service message, thereby avoiding transmission congestion caused due to the capacity of the service message, and improving message push efficiency.

A person of ordinary skill in the art may understand that all or some of the processes of the method in the foregoing embodiments may be implemented by a computer program instructing relevant hardware. The program may be stored in a computer readable storage medium. During execution, the program may include the processes in the foregoing method embodiment. The storage medium may be a magnetic disk, an optical disc, a read-only memory (Read-Only Memory, ROM), a random access memory (Random Access Memory, RAM), or the like.

The foregoing descriptions are merely preferred embodiments of the present disclosure, but are not intended to limit the present disclosure. Therefore, equivalent changes made according to the claims of the present disclosure still fall within the scope of the present disclosure.

What is claimed is:

1. A method for message processing, comprising:
receiving, by circuitry of an information processing apparatus, a message push request, the message push request comprising message content to be sent to one or more users;
determining whether a size characteristic of the message content meets a size requirement;
when the size characteristic meets the size requirement, providing the message content to a cluster-based storage service system to store;
receiving, from the cluster-based storage service system, an identifier for identifying the message content in the cluster-based storage service system;
generating a service message, the service message carrying the identifier of the message content;
sending the service message to a terminal device associated with one of the one or more users;
receiving a download request from the terminal device when the terminal device determines a message type of the message push request is a long message type based on the size characteristic of the message content; and
sending a download address of the message content in the cluster-based storage service system to the terminal device in response to the download request from the terminal device, the download address being used by the terminal device to download the message content from the cluster-based storage service system.

2. The method according to claim 1, wherein the determining whether the size characteristic of the message content meets the size requirement comprises:
obtaining a data volume of the message content;
determining whether the data volume is greater than a threshold value of a maximum transmission unit (MTU); and
when the data volume is greater than the threshold value of the MTU, determining that the size characteristic is the long message type; and
when the data volume is less than the threshold value of the MTU, determining that the size characteristic is a short message type.

3. The method according to claim 1, wherein the cluster-based storage service system comprises at least one storage server that each has a unique IP address, and the providing the message content to the cluster-based storage service system to store further comprises:
sending a storage instruction to the at least one storage server, the storage instruction comprising the message content, and the storage instruction being used for controlling the at least one storage server to store the message content and generate a unique identifier of the message content stored in the at least one storage server.

4. The method according to claim 3, wherein the sending the download address of the message content in the cluster-based storage service system to the terminal device in response to the download request from the terminal device further comprises:
when the download request that carries the identifier of the message content is received, sending one or more IP addresses of the at least one storage server to the terminal device.

5. The method according to claim 3, wherein the sending the download address of the message content in the cluster-based storage service system to the terminal device in response to the download request from the terminal device further comprises:
when the download request that carries the identifier of the message content and a source IP address is received, selecting, from one or more IP addresses of the at least one storage server, a target IP address based on the source IP address and sending the target IP address to the terminal device.

6. The method according to claim 5, wherein the selecting, from the one or more IP addresses of the at least one storage server, the target IP address based on the source IP address further comprises:
selecting, from the one or more IP addresses of the at least one storage server, a target address with a shortest transmission path to the source IP address.

7. The method according to claim 1, wherein the receiving, from the cluster-based storage service system, the identifier for identifying the message content in the cluster-based storage service system further comprises:
receiving the identifier that is generated according to an attribute of the message content.

8. An information processing apparatus, comprising:
interface circuitry configured to receive a message push request, the message push request comprising message content to be sent to one or more users; and
processing circuitry configured to:
determine whether a size characteristic of the message content meets a size requirement;
when the size characteristic meets the size requirement, provide, via the interface circuitry, the message content to a cluster-based storage service system to store;
receive, from the cluster-based storage service system via the interface circuitry, an identifier for identifying the message content in the cluster-based storage service system;
generate a service message, the service message carrying the identifier of the message content;
send, via the interface circuitry, the service message to a terminal device associated with one of the one or more users;
receive a download request from the terminal device when the terminal device determines a message type of the message push request is a long message type based on the size characteristic of the message content; and
send a download address of the message content in the cluster-based storage service system to the terminal device in response to the download request from the terminal device, the download address being used by the terminal device to download the message content from the cluster-based storage service system.

9. The information processing apparatus according to claim 8, wherein
the processing circuitry is configured to:
obtain a data volume of the message content;
determine whether the data volume is greater than a threshold value of a maximum transmission unit (MTU); and
when the data volume is greater than the threshold value of the MTU, determine that the size characteristic is the long message type; and
when the data volume is less than the threshold value of the MTU, determining that the size characteristic is a short message type.

10. The information processing apparatus according to claim 8, wherein the cluster-based storage service system comprises at least one storage server that each has a unique IP address, and the processing circuitry is configured to:
send a storage instruction to the at least one storage server, the storage instruction comprising the message content, and the storage instruction being used for controlling the at least one storage server to store the message content and generate a unique identifier of the message content stored in the at least one storage server.

11. The information processing apparatus according to claim 10, wherein
the processing circuitry is configured to perform:
when the download request that carries the identifier of the message content is received, send one or more IP addresses of the at least one storage server to the terminal device.

12. The information processing apparatus according to claim 10, wherein:
the processing circuitry is configured to perform:
when the download request that carries the identifier of the message content and a source IP address is received, select, from one or more IP addresses of the at least one storage server, a target IP address based on the source IP address and send the target IP address to the terminal device.

13. The information processing apparatus according to claim 12, wherein:
the processing circuitry is configured to perform:
select, from the one or more IP addresses of the at least one storage server, a target address with a shortest transmission path to the source IP address.

14. The information processing apparatus according to claim 8, wherein the processing circuitry is configured to:
receive the identifier that is generated according to an attribute of the message content.

15. A non-transitory computer-readable medium storing instructions which when executed by a computer causes the computer to perform a method for message processing, the method comprising:
receiving a message push request, the message push request comprising message content to be sent to one or more users;
determining whether a size characteristic of the message content meets a size requirement;
when the size characteristic meets the size requirement, providing the message content to a cluster-based storage service system to store;
receiving, from the cluster-based storage service system, an identifier for identifying the message content in the cluster-based storage service system;
generating a service message, the service message carrying the identifier of the message content;
sending the service message to a terminal device associated with one of the one or more users;
receiving a download request from the terminal device when the terminal device determines a message type of the message push request is a long message type based on the size characteristic of the message content; and
sending a download address of the message content in the cluster-based storage service system to the terminal device in response to the download request, the download address being used by the terminal device to download the message content from the cluster-based storage service system.

16. The non-transitory computer-readable medium according to claim 15, wherein the step of determining whether the size characteristic of the message content meets the size requirement comprises:
obtaining a data volume of the message content;
determining whether the data volume is greater than a threshold value of a maximum transmission unit (MTU); and
when the data volume is greater than the threshold value of the MTU, determining that the size characteristic is the long message type; and
when the data volume is less than the threshold value of the MTU, determining that the size characteristic is a short message type.

17. The non-transitory computer-readable medium according to claim 15, wherein the cluster-based storage service system comprises at least one storage server that each has a unique IP address, and the providing the message content to the cluster-based storage service system to store further comprises:
sending a storage instruction to the at least one storage server, the storage instruction comprising the message content, and the storage instruction being used for controlling the at least one storage server to store the message content and generate a unique identifier of the message content stored in the at least one storage server.

18. The non-transitory computer-readable medium according to claim 17, wherein the step of sending the download address of the message content in the cluster-based storage service system to the terminal device in response to the download request further comprises:
when the download request that carries the identifier of the message content is received, sending one or more IP addresses of the at least one storage server to the terminal device.

19. The non-transitory computer-readable medium according to claim 17, wherein the step of sending the download address of the message content in the cluster-based storage service system to the terminal device in response to the download request further comprises:
when the download request that carries the identifier of the message content and a source IP address is received, selecting, from one or more IP addresses of the at least one storage server, a target IP address based on the source IP address and sending the target IP address to the terminal device.

20. The non-transitory computer-readable medium according to claim 19, wherein the step of selecting, from the one or more IP addresses of the at least one storage server, the target IP address based on the source IP address further comprises:
selecting, from the one or more IP addresses of the at least one storage server, a target address with a shortest transmission path to the source IP address.

* * * * *